(12) United States Patent
Yanari (10) Patent No.: US 7,959,285 B2
(45) Date of Patent: Jun. 14, 2011

(54) METHOD FOR DESIGNING PROGRESSIVE REFRACTION LENS, METHOD FOR MANUFACTURING THE SAME, AND EYEGLASSES LENS SUPPLYING SYSTEM

(75) Inventor: Mitsuhiro Yanari, Tokyo (JP)

(73) Assignee: Nikon-Essilor Co., Ltd., Tokyo (JP)

( * ) Notice: Subject to any disclaimer, the term of this patent is extended or adjusted under 35 U.S.C. 154(b) by 267 days.

(21) Appl. No.: 12/374,257

(22) PCT Filed: Jul. 18, 2007

(86) PCT No.: PCT/JP2007/064142
§ 371 (c)(1),
(2), (4) Date: Jan. 16, 2009

(87) PCT Pub. No.: WO2008/010504
PCT Pub. Date: Jan. 24, 2008

(65) Prior Publication Data
US 2009/0326693 A1    Dec. 31, 2009

(30) Foreign Application Priority Data

Jul. 20, 2006 (JP) ................................. 2006-198530

(51) Int. Cl.
*G02C 7/02* (2006.01)
(52) U.S. Cl. ......... 351/177; 351/161; 351/164; 351/168
(58) Field of Classification Search .................. 351/159, 351/161, 164, 168–172, 177
See application file for complete search history.

(56) References Cited

U.S. PATENT DOCUMENTS

| | | | |
|---|---|---|---|
| 5,926,250 A | 7/1999 | Mukaiyama et al. | |
| 6,139,148 A | 10/2000 | Menezes | |
| 6,220,704 B1 | 4/2001 | Mukaiyama et al. | |
| 2004/0109134 A1 | 6/2004 | Sato et al. | |
| 2005/0099596 A1 | 5/2005 | Kato | |
| 2006/0007392 A1 | 1/2006 | Esser et al. | |

FOREIGN PATENT DOCUMENTS

| | | |
|---|---|---|
| EP | 1 026 533 A2 | 8/2000 |
| JP | 2000-066148 | 3/2000 |
| JP | 2004-138794 | 5/2004 |
| JP | 3800629 | 5/2006 |
| WO | WO 97/19383 | 5/1997 |

OTHER PUBLICATIONS

European Search Report dated Oct. 7, 2010.

*Primary Examiner* — Darryl J Collins
(74) *Attorney, Agent, or Firm* — Finnegan, Henderson, Farabow, Garrett & Dunner, L.L.P.

(57) ABSTRACT

A subject matter is to provide an efficient method for designing a progressive refraction lens in consideration of not only its optical performance but also its appearance performance. The method for designing the progressive refraction lens includes a step (S030) for determining addition power of an entire lens that is a summation of addition power of a front surface and that of a back surface and a step (S040) for determining the addition power of the front surface. The method for designing the progressive refraction lens is characterized in determining to make the addition power of the front surface not less than 0 but smaller than that of the entire lens in the case that the appearance performance is considered to be more important than the optical performance while determining to make the addition power of the front surface larger than that of the entire lens in the case that the optical performance is considered to be more important than the appearance performance.

8 Claims, 12 Drawing Sheets

METHOD FOR DESIGNING PROGRESSIVE REFRACTION LENS, METHOD FOR MANUFACTURING THE SAME, AND EYEGLASSES LENS SUPPLYING SYSTEM

TECHNICAL FIELD

The present invention relates to a method for designing a progressive addition lens, a method for producing the same, and a spectacle lens supplying system. Particularly the invention relates to the progressive addition lens designing method in which a lens having a desired appearance performance can be supplied depending on an extent to which the appearance performance of the progressive addition lens is emphasized, the progressive addition lens producing method, and the spectacle lens supplying system.

BACKGROUND ART

A progressive addition lens includes a region used for far vision (hereinafter referred to as "portion for far vision"), a region used for near vision (hereinafter referred to as "portion for near vision"), and a progressive region (hereinafter referred to as "progressive portion"). The portion for far vision is located in an upper portion of the lens in use, and the portion for far vision is suitable for relatively far vision. The portion for near vision is located in a lower portion of the lens, and the portion for near vision is suitable for relatively near vision. The progressive portion is located between the portion for far vision and the portion for near vision, and in the progressive portion a surface refractive power is continuously changed. With a spectacle in which a progressive addition lens is used, replacement or removal is not required for switching between the far vision and the near vision. There is no clear boundary line in the progressive addition lens, and the progressive addition lens is excellent in appearance. Accordingly, the progressive addition lens recently becomes the mainstream in presbytism correction spectacle lenses.

A front surface progressive addition lens whose progressive surface is disposed only in a front surface has been the mainstream in conventional progressive addition lenses. However, with development of an aspherical processing technique, a complicated aspherical surface such as a free-form surface can freely be processed at low cost in a short period of time. Therefore, recently a back surface progressive addition lens and a double-sided progressive addition lens are commercially available. In the back surface progressive addition lens, a front surface is formed into a spherical surface while the progressive surface is disposed in a back surface. In the double-sided progressive addition lens, both the front surface and the back surface are formed into progressive surfaces. Particularly, double-sided progressive addition lenses can realize high optical performance (for example, see WO 1997-019383).

On the other hand, not only the optical performance but also good-looking appearance (hereinafter referred to as appearance performance) is required in spectacle lenses. That a center thickness and an edge thickness of the lens are excessively increased, that a height in a thickness direction from the center of the front surface to a peripheral portion (hereinafter referred to as front height) is not excessively increased, and that a distortion of a facial outline is excessively increased in use are included in the appearance performance. That is, in the spectacle lens, even if the optical performance is better improved, usually the wearer does not accept the thick, large-front height lens in which the distortion of the facial outline is increased in use.

Accordingly, in the case where the progressive addition lens for the spectacle is designed, it is necessary that the progressive addition lens be designed in consideration of not only the optical performance but also the appearance performance. However, in the conventional technique, the efficient progressive addition lens designing method is not developed from the viewpoints of not only the optical performance but also the appearance performance. In the conventional method for designing the progressive addition lens for spectacles, after the front surface shape is determined from the base curve and the addition power, the back surface shape is determined if needed in order to improve the optical performance, only the lens center thickness is adjusted for the appearance performance.

There is the need for the method for designing the progressive addition lens in view of not only the optical performance but also the appearance performance.

DISCLOSURE OF THE INVENTION

A progressive addition lens designing method according to the invention includes the steps of determining an addition power of an entire lens which is of a sum of an addition power of a front surface and an addition power of a back surface; and determining the addition power of the front surface, and the progressive addition lens designing method is characterized in that, in the step of determining the addition power of the front surface, the addition power of the front surface is determined so as to be not lower than zero and lower than the addition power of the entire lens when lens appearance performance is emphasized rather than lens optical performance, and the addition power of the front surface is determined so as to be more than the addition power of the entire lens when the lens optical performance is emphasized rather than the lens appearance performance.

In the progressive addition lens designing method according to the invention, because the addition power of the front surface is determined according to the extent to which the lens appearance performance is emphasized, the appearance performance that is hardly adjusted in the conventional technique can be considered as a design factor, and the progressive addition lens designing method of the invention can meet various needs of the spectacle user for the appearance performance.

Accordingly, in the invention, the method for efficiently designing the progressive addition lens is obtained in view of not only the optical performance but also the appearance performance.

BEST MODE FOR CARRYING OUT THE INVENTION

Figure 10:
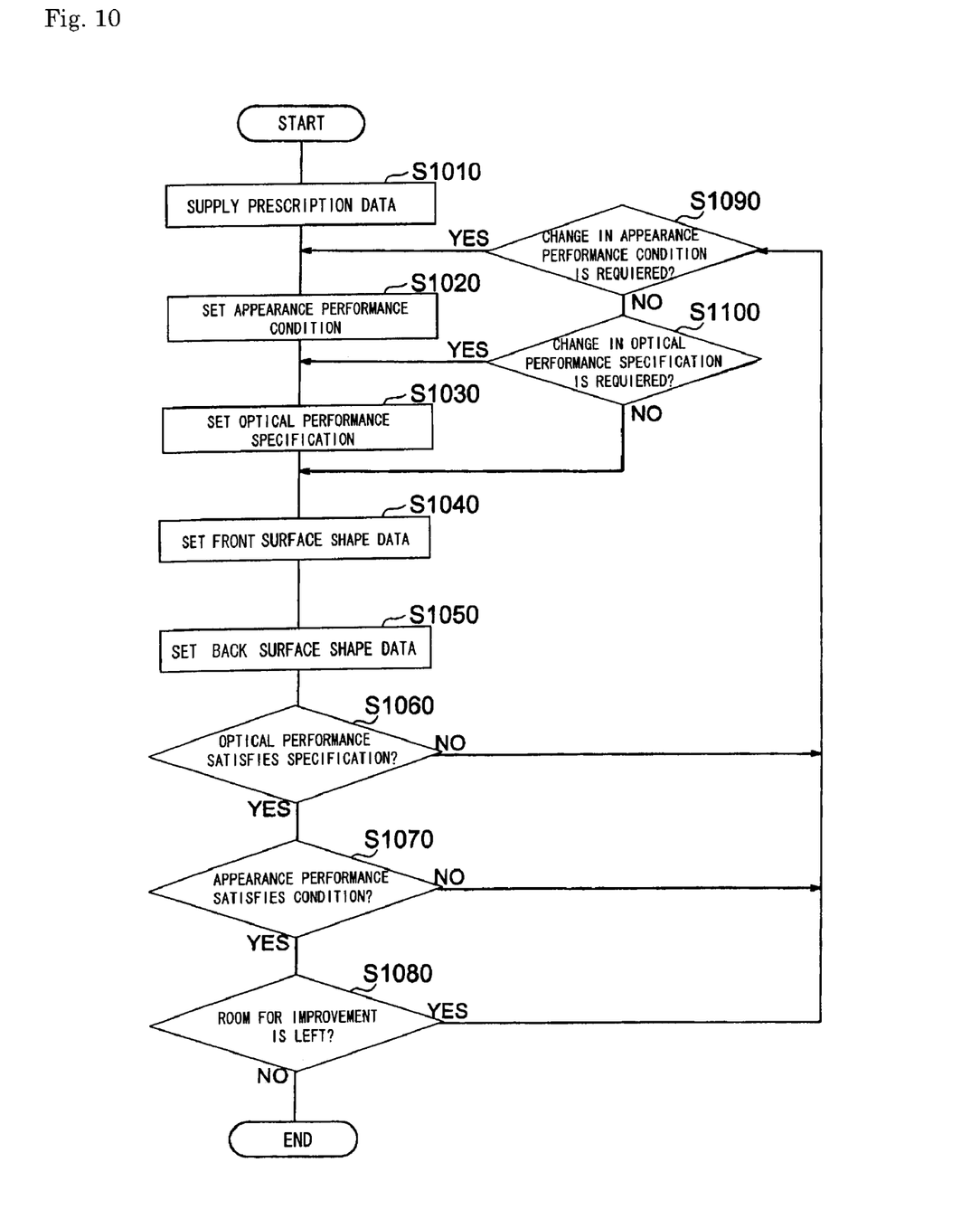
FIG. 10 is a flowchart showing a progressive addition lens designing method.

FIG. 10 is a flowchart showing a progressive addition lens designing method.

In Step S1010, prescription data of a spectacle wearer is fed. Examples of the prescription data of the spectacle wearer include a spherical power, an cylindrical power, a cylinder axis, an addition power of the entire lens, a lens diameter, and a frame shape.

In Step S1020, an appearance performance condition is set. The appearance performance condition means a value of an item contributing to the appearance. Examples of the appearance performance condition include a lens front height, a lens center thickness, a lens edge thickness, a lens weight, a front surface base curve, and an amount of distortion of facial outline in use of the spectacle. At least one of values of the items may be set within a certain range. The value may be arbitrarily set, or the value may be selected from values previously stored in a database. The appearance performance condition is set in consideration of the lens diameter or frame shape. Desirably appearance performance condition should be set in consideration of limitations or conditions in the design or processing.

In Step S1030, an optical performance specification of the progressive addition lens is set. Examples of the optical performance specification means a type of the progressive addition lens, a dioptric power for far vision, a dioptric power for near vision, an addition power, an astigmatism distribution, a mean refractive power distribution, and a distortion aberration.

In Step S1040, front surface shape data is set. The type of the progressive addition lens, a curvature of the front surface base curve, a ratio of the front surface addition power to the addition power of the entire lens, and the like are set in consideration of the appearance performance condition set in Step S1020 and the optical performance specification of the progressive addition lens set in Step S1030. The ratio may arbitrarily be set, or the base curve or the ratio previously stored in the database for each type of the lens may be selected.

In Step S1050, the back surface shape data and the center thickness are set. Back surface shape data is set based on the front surface shape data set in Step S1040 and the spherical power, the cylindrical power, the cylinder axis, and the addition power of the entire lens of the spectacle wearer that are fed in Step S1010. The data previously stored in the database may be used as the back surface shape data, or the back surface shape data may be generated by performing an optimization computation each time a lens is designed.

The lens center thickness is set in consideration of the front surface shape data, the back surface shape data, the lens diameter, the frame shape, the limitations or conditions in design or process, and the like.

In Step S1060, it is determined whether or not the front surface shape data set in Step S1040 and the back surface shape data set in Step S1050 satisfy the optical performance specification of the progressive addition lens set in Step S1030. The process goes to Step S1090 when the front surface shape data and the back surface shape data do not satisfy the optical performance specification of the progressive addition lens. In Step S1090, it is determined whether or not a change in the appearance performance condition is required. The process returns to Step S1020 when the change in the appearance performance condition is required. The process goes to Step S1100 when the change in the appearance performance condition is not required. In Step S1100, it is determined whether or not a change in the optical performance specification is required. The process returns to Step S1030 when the change in the optical performance specification is required. The process goes to Step S1040 when the change in the optical performance specification is not required. The process goes to Step S1070 when the optical performance specification of the progressive addition lens is satisfied.

In Step S1070, it is determined whether or not the front surface shape data set in Step S1040 and the back surface shape data set in Step S1050 satisfy the appearance performance condition set in Step S1020. The process goes to Step S1090 when the front surface shape data and the back surface shape data do not satisfy the appearance performance condition. In Step S1090, it is determined whether or not a change in the appearance performance condition is required. The process returns to Step S1020 when the change in the appearance performance condition is required. The process goes to Step S1100 when the change in the appearance performance condition is not required. In Step S1100, it is determined whether or not the change in the optical performance specification is required. The process returns to Step S1030 when the change in the optical performance specification is required. The process goes to Step S1040 when the change in the optical performance specification is not required. The process goes to Step S1080 when the change in the appearance performance condition is satisfied.

In Step S1080, it is determined whether or not room for improvement is left in the optical performance or appearance performance. The process goes to Step S1090, when the room for improvement is left in the optical performance or appearance performance, and when the improvement is to be performed. In Step S1090, it is determined whether or not the change in the appearance performance condition is required. The process returns to Step S1020 when the change in the appearance performance condition is required. The process goes to Step S1100 when the change in the appearance performance condition is not required. In Step S1100, it is determined whether or not the change in the optical performance specification is required. The process returns to Step S1030 when the change in the optical performance specification is required. The process goes to Step S1040 when the change in the optical performance specification is not required. When the room for improvement is not left in the optical performance or appearance performance, the process is ended.

In the procedure described above, the order may be changed in Step S1020 and Step S1030, and the order may also be changed in Step S1060 and Step S1070.

Figure 1:
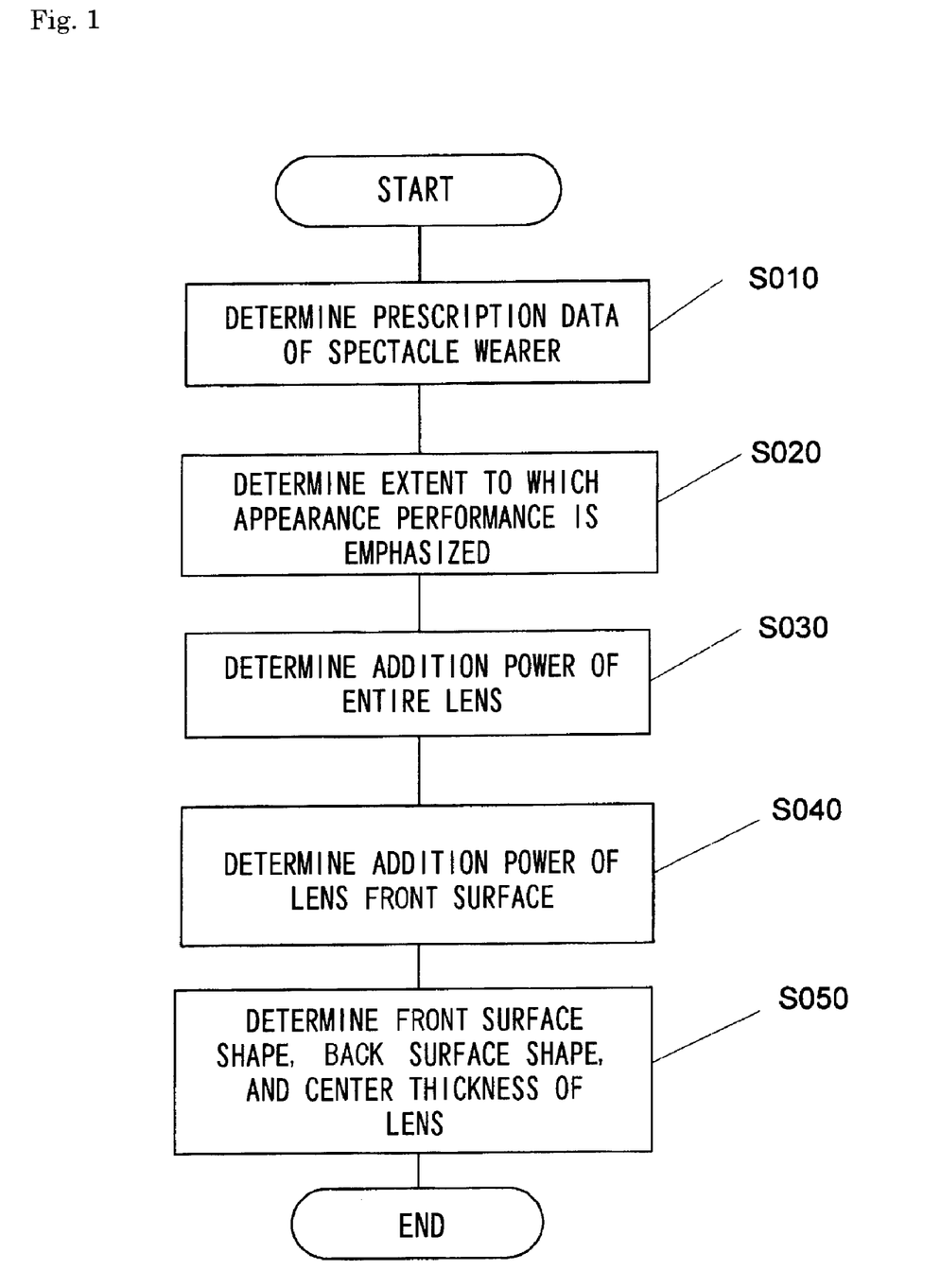
FIG. 1 is a flowchart showing a progressive addition lens designing method according to an embodiment of the invention.

FIG. 1 is a flowchart showing a progressive addition lens designing method according to an embodiment of the invention. Steps S010 to S050 of FIG. 1 correspond to Steps S1010 to S1050 of FIG. 10.

In Step S010, the prescription data of the spectacle wearer are determined. Examples of the prescription data of the spectacle wearer include the dioptric power for far vision (refractive power of the portion for far vision), the dioptric power for near vision (refractive power of the portion for near vision), the cylindrical power, the cylinder axis, the lens diameter, and the frame shape.

In Step S020, an extent to which the appearance performance of the spectacle lens is emphasized is determined. For example, the extent is classified into the case in which the appearance performance of the spectacle lens is emphasized rather than the optical performance, the case in which the optical performance and the appearance performance are balanced, and the case in which the optical performance is emphasized rather than the appearance performance. The process in Step S020 may be performed at any point before the process in Step S040.

In Step S030, the addition power of the entire lens is determined. As used herein, the addition power shall mean a difference between the refractive power of the portion for near vision and the refractive power of the portion for far vision. Accordingly, the addition power of the entire lens is determined by the prescription data of the spectacle wearer. The addition power and the refractive power are expressed by units of diopter, which is of an inverse number of a focal distance in terms of meter.

In Step S040, the addition power of the front surface is determined. As used herein, the addition power of the entire lens shall mean a sum of the addition power of the front surface and the addition power of the back surface. Accordingly, the determination of the addition power of the front surface means that the addition power of the entire lens is allocated to the addition power of the front surface and the addition power of the back surface. The addition power of the front surface is determined by the following procedure.

In the case where the lens appearance performance is emphasized rather than the lens optical performance, the addition power of the front surface is determined so as to be not lower than zero and lower than the addition power of the entire lens. At this point, the addition power of the back surface becomes a positive value.

The center thickness, edge thickness, and front height of the lens can be decreased to improve the appearance performance, when the addition power of the front surface is decreased. On the other hand, the optical performance such as the astigmatism and the distortion aberration is deteriorated when the addition power of the back surface is set at a positive value. However, because the base curve is not changed in the portion for far vision, the deterioration of the optical performance is limited to the portion for near vision.

When the addition power of the front surface is set at a negative value, the distortion aberration is remarkably deteriorated in the portion for near vision, and the edge thickness in the lower portion of the lens becomes larger than the edge thickness in the upper portion of the lens. Particularly, in the case of the lens having a positive dioptric power for far vision, it is not preferable that the edge thickness in the lower portion of the lens becomes larger than the edge thickness in the upper portion of the lens. Therefore, the addition power of the front surface is set at zero or more.

In the case where the lens optical performance is emphasized rather than the lens appearance performance, the addition power of the front surface is determined so as to be larger than the addition power of the entire lens.

When the addition power of the back surface is set at the negative value while the addition power of the front surface is larger than the addition power of the entire lens, the front height and center thickness of the lens are increased because the curvatures of the front surface and back surface are increased in the portion for near vision. However, compared with conventional progressive addition lenses, a lens prism effect, the astigmatism, and the distortion aberration can be reduced in the portion for near vision, and the optical performance is remarkably improved. Additionally, because the base curve remains unchanged in the portion for far vision, the change in the appearance performance is limited to the portion for near vision.

In the case where the lens optical performance and the lens appearance performance are balanced, the addition power of the front surface is determined so as to be substantially equal to the addition power of the entire lens.

Specifically, in the case where the lens appearance performance is emphasized rather than the lens optical performance, for example, the ratio of the addition power of the front surface to the addition power of the entire lens is arranged to range from 0 to 0.8, and the ratio of the addition power of the back surface to the addition power of the entire lens is set at 0.2 or more.

Assuming that Add is the addition power of the entire lens, Add1 is the addition power of the front surface, and Add2 is the addition power of the back surface, the following relationships should be satisfied in the case where the lens appearance performance is emphasized rather than the lens optical performance:

$$Add = Add1 + Add2 \tag{1}$$

$$0 \leq Add1 \leq Add \times 0.8 \tag{2}$$

Which value is set for the addition power of the front surface in the range satisfying the above relationships is determined based on the extent to which the appearance performance is emphasized.

In the case where the lens optical performance is emphasized, the ratio of the addition power of the front surface to the addition power of the entire lens is set at 1.2 or more, and the ratio of the addition power of the back surface to the addition power of the entire lens is set at −0.2 or less.

The addition power of the front surface becomes positive because the ratio of the addition power of the front surface to the addition power of the entire lens is set at 1.2 or more.

Assuming that Add is the addition power of the entire lens, Add1 is the addition power of the front surface addition power, and Add2 is the addition power of the back surface addition power, the following relationships should be satisfied in the case where the lens optical performance is emphasized rather than the lens appearance performance:

$$Add = Add1 + Add2 \tag{1}$$

$$Add \times 1.2 \leq Add1 \tag{3}$$

When the addition power of the front surface is excessively increased, unfortunately the appearance performance is clearly deteriorated and sometimes the lens cannot be mounted on the frame.

Accordingly, desirably the following relationship concerning the addition power Add1 of the front surface should be satisfied:

$$\text{Add} \times 1.2 \leq \text{Add1} \leq \text{Add} \times 3.0 \quad (4)$$

Furthermore, desirably the following relationship concerning the addition power Add1 of the front surface should be satisfied:

$$\text{Add} \times 1.2 \leq \text{Add1} \leq \text{Add} \times 2.0 \quad (5)$$

Which value is set for the addition power of the front surface in the range satisfying the above relationships is determined based on the extent to which the optical performance is emphasized.

In the case where the lens optical performance and the lens appearance performance are balanced, the ratio of the addition power of the front surface to the addition power of the entire lens is set at a value that is larger than 0.8 and smaller than 1.2, and the ratio of the addition power of the back surface to the addition power of the entire lens is set at a value that is larger than −0.2 and smaller than 0.2.

The addition power of the front surface becomes positive because the ratio of the addition power of the front surface to the addition power of the entire lens is set at 0.8 or more.

Assuming that Add is the addition power of the entire lens, Add1 is the addition power of the front surface, and Add2 is the addition power of the back surface, the following relationships should be satisfied in the case where the lens optical performance and the lens appearance performance are balanced:

$$\text{Add} = \text{Add1} + \text{Add2} \quad (1)$$

$$\text{Add} \times 0.8 < \text{Add1} < \text{Add} \times 1.2 \quad (6)$$

Which value is set for the addition power of the front surface in the range satisfying the above relationships is determined in consideration of the optical performance and appearance performance.

In Step S050, the front surface shape is determined based on the addition power of the front surface. The front surface shape is determined according to the addition power of the front surface, the base curve, the lens type, and the like. The shape may be arbitrarily determined for each leans or the shape may be selected from the predetermined shapes. Then the back surface shape is determined in consideration of the front surface shape, a spherical power, the cylindrical power and the cylinder axis of the spectacle wearer, the addition power of the back surface, and user's use conditions such as a distance between eyes and the lens, a gradient of a spectacle frame on which the lens is mounted with respect to the eyes, and the lens shape determined from the shape of the spectacle frame on which the lens is mounted. The lens center thickness is set in consideration of the front surface shape, and the back surface shape, the lens diameter, the frame shape, the conditions and limitations in the design and processing if needed. The shape previously prepared in the database or the like may be used as the back surface shape, or the back surface shape may be generated by performing the optimization computation of the optical performance for each lens.

In the design method of the embodiment described above, the ratio of the addition power of the front surface to the addition power of the entire lens is determined according to the extent to which the appearance performance is emphasized, and the design is performed such that the addition power of the entire lens and the ratio become desired values. Accordingly, the design is performed in consideration of a balance between the addition power of the entire lens and the appearance performance corresponding to the ratio. As a result, Steps S1060 to S1100 of FIG. 10 can largely be simplified.

As described later, the lens shape is displayed to the spectacle wearer, (sales clerk of) a spectacle store, concerned persons, and the like, after the design is performed through Steps S010 to S050 of FIG. 1, and the extent to which the spectacle wearer or the like emphasizes the appearance performance may be changed.

The progressive addition lens supply system and the progressive addition lens producing method will be described below.

Figure 11:
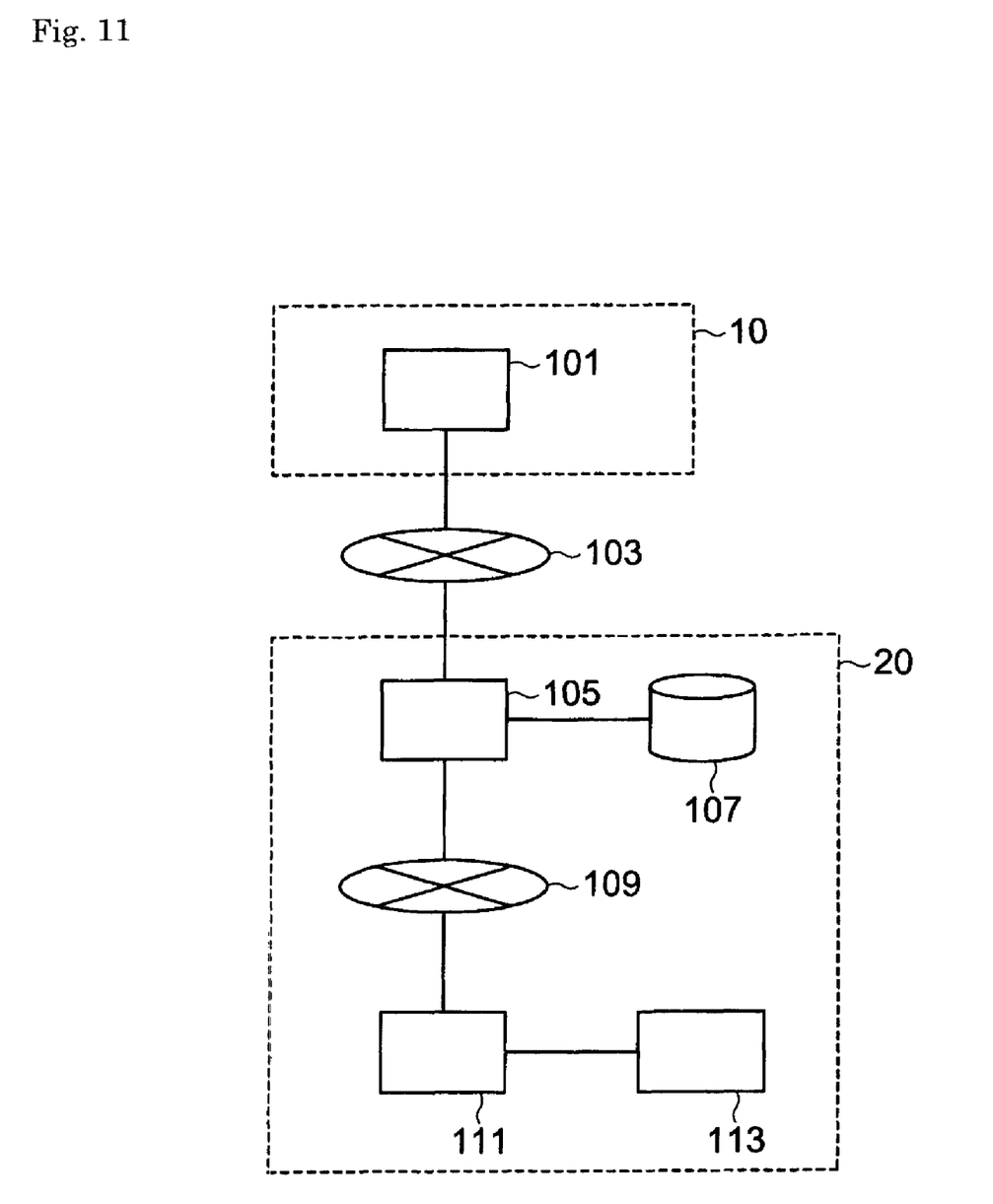
FIG. 11 shows a configuration of a progressive addition lens supply system according to an embodiment of the invention.

FIG. 11 shows a configuration of a progressive addition lens supply system according to an embodiment of the invention.

The progressive addition lens supply system includes a data terminal 101, a data storage unit 107, a design unit 105, and a processing machine control unit 111. The data terminal 101, the design unit 105, and the processing machine control unit 111 may be formed by various types of computers. For example, the data terminal 101 is placed in a spectacle store 10. For example, the design unit 105, the data storage unit 107, and the processing machine control unit 111 are placed in a plant 20 in which the spectacles are produced. The data terminal 101 and the design unit 105 are connected by a line 103 such as the Internet. The design unit 105 and the processing machine control unit 111 are connected by a line 109 such as an intranet. A lens processing machine 113 is connected to the processing machine control unit 111.

Figure 12:
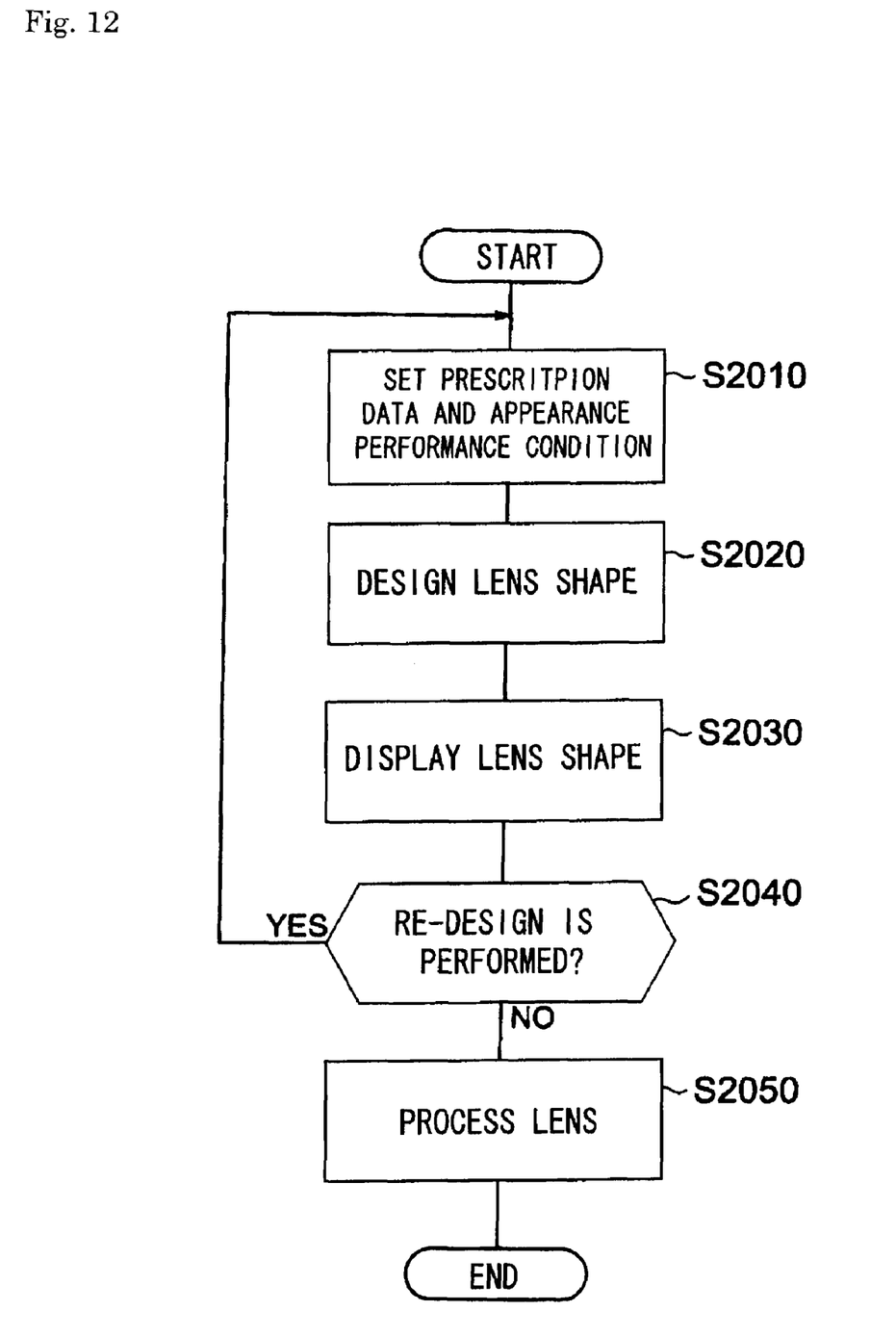
FIG. 12 is a flowchart showing a progressive addition lens producing method according to an embodiment of the invention.

FIG. 12 is a flowchart showing a progressive addition lens producing method according to an embodiment of the invention.

In Step S2010, the prescription data of the spectacle wearer and the appearance performance condition (extent to which the appearance performance is emphasized) are set from the data terminal 101. The data terminal 101 transmits these pieces of data to the design unit 105 through the line 103.

In Step S2020, the design unit 105 designs the lens using the prescription data of the spectacle wearer, the extent to which the appearance performance is emphasized, and the design data stored in the data storage unit 107 through Steps S030 to S050 of FIG. 1. The design data includes the expressions (1) to (6) which are stored while correlated with the extent to which the appearance performance is emphasized.

In Step S2030, the design unit 105 transmits the design result to the data terminal 101 through the line 103, and the data terminal 101 displays the design result to the spectacle wearer, (sales clerk of) the spectacle store, concerned persons, and the like. Examples of the displayed design result may include sectional views of the lens (FIGS. 2, 4, 6, and 8) and astigmatism distributions (FIGS. 3, 5, 7, and 9), which will be described later. The spectacle wearer, (sales clerk of) the spectacle store, concerned persons, and the like study the displayed design result to determine whether or not re-design is required.

In Step 2040, an instruction whether or not the re-design is performed is set from the data terminal 101. When the re-design is performed, the process returns to Step S2010. In Step S2010, one of the prescription data of the spectacle wearer or the extent to which the appearance performance is emphasized is corrected and set from the data terminal 101. When the re-design is not performed, the process goes to Step S2050.

In Step S2050, the design unit 105 transmits the design result to the processing machine control unit 111 through the line 109, and the processing machine control unit 111 processes the lens.

A lens designed according to the embodiment of the invention will be described below. All the lenses designed according to the embodiment of the invention are a progressive addition lens having a spherical power of 0.00 (diopter), an cylindrical power of 0.00 (diopter), an addition power ADD of 2.00 (diopter), a base curve of 3.75 (diopter) at a front surface far vision reference point, a lens refractive index of 1.60, and a diameter of 75 mm.

Figure 2:
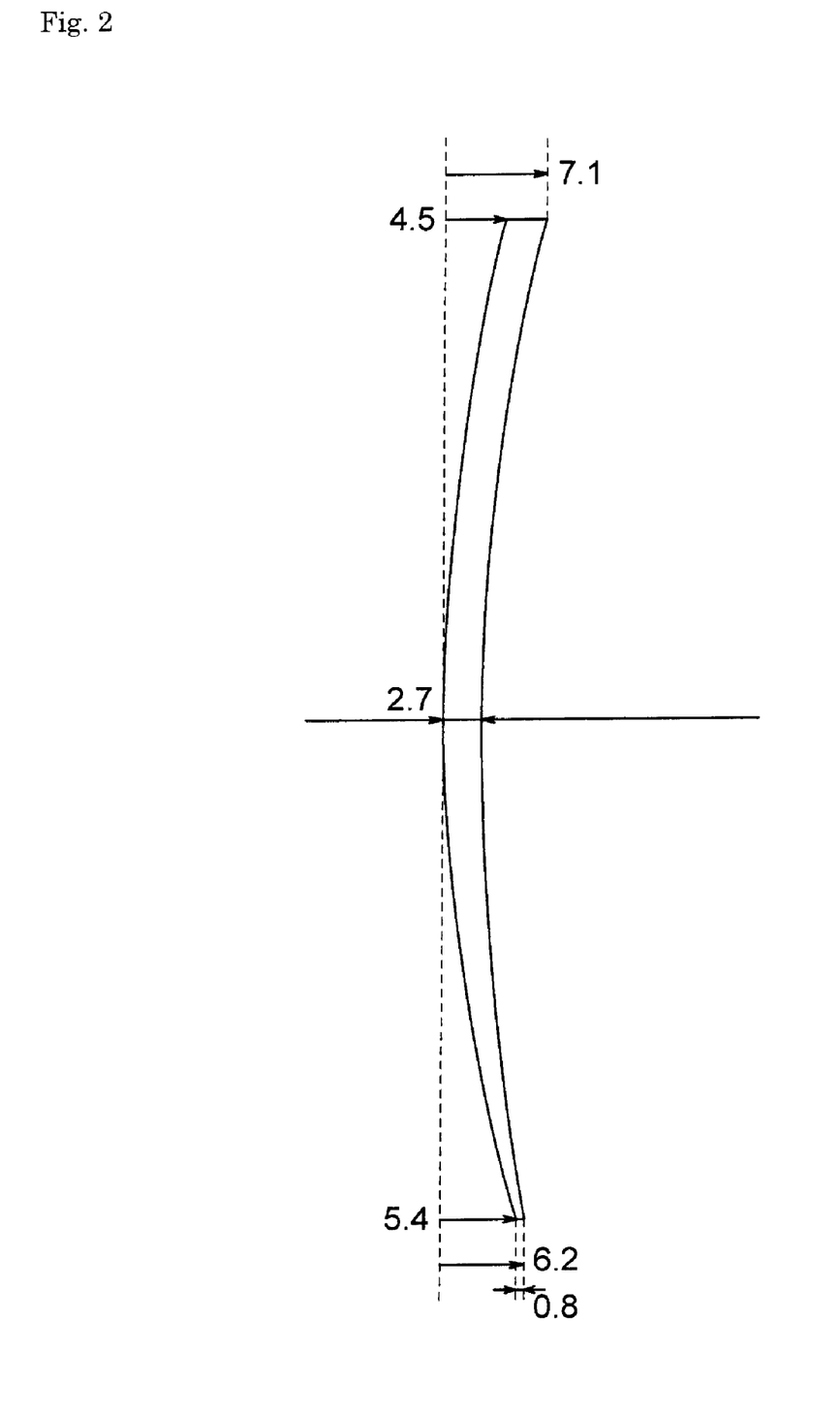
FIG. 2 is a sectional view showing a progressive addition lens in a lengthwise direction in use, the progressive addition lens being designed while appearance performance is emphasized according to an embodiment of the invention.

FIG. 2 is a sectional view showing a progressive addition lens in a lengthwise direction in use, and the progressive addition lens is designed while the appearance performance is emphasized rather than the optical performance according to an embodiment of the invention. In the embodiment, the front surface has the addition power of 1.00 diopter, and the back surface has the addition power of 1.00 diopter. In the embodiment and the following embodiments, the entire lens has the addition power of 2.00 diopter. Therefore, the ratio of the addition power of the front surface to the addition power of the entire lens is 0.5.

In FIG. 2, the portion for near vision (lens lower portion) has the front height of 6.2 mm, and the lens lower portion has the edge thickness of 0.8 mm.

Figure 3:
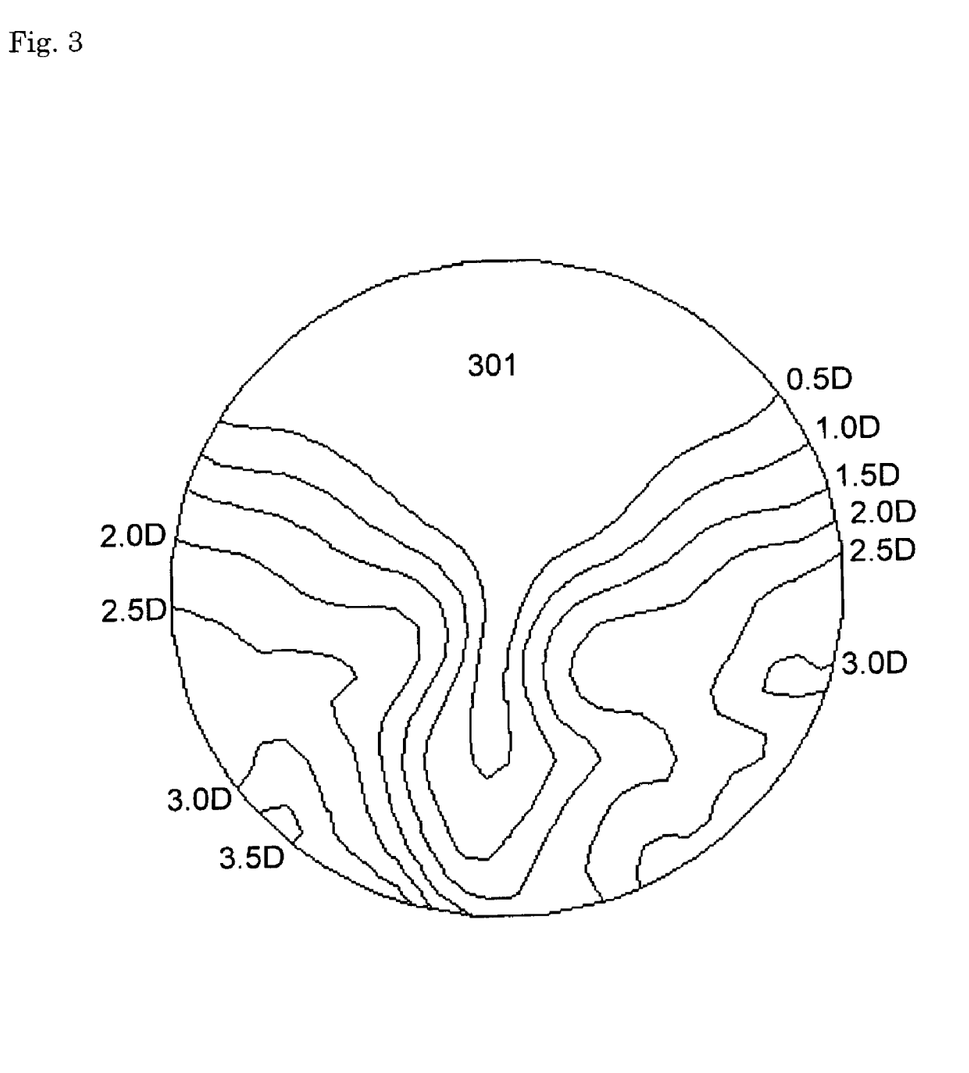
FIG. 3 shows an astigmatism distribution of the progressive addition lens of FIG. 2 with a transmitted light beam.

FIG. 3 shows an astigmatism distribution of the progressive addition lens of FIG. 2 with a transmitted light beam. FIG. 3 shows the astigmatism in figures. The astigmatism has a unit of diopter.

Figure 4:
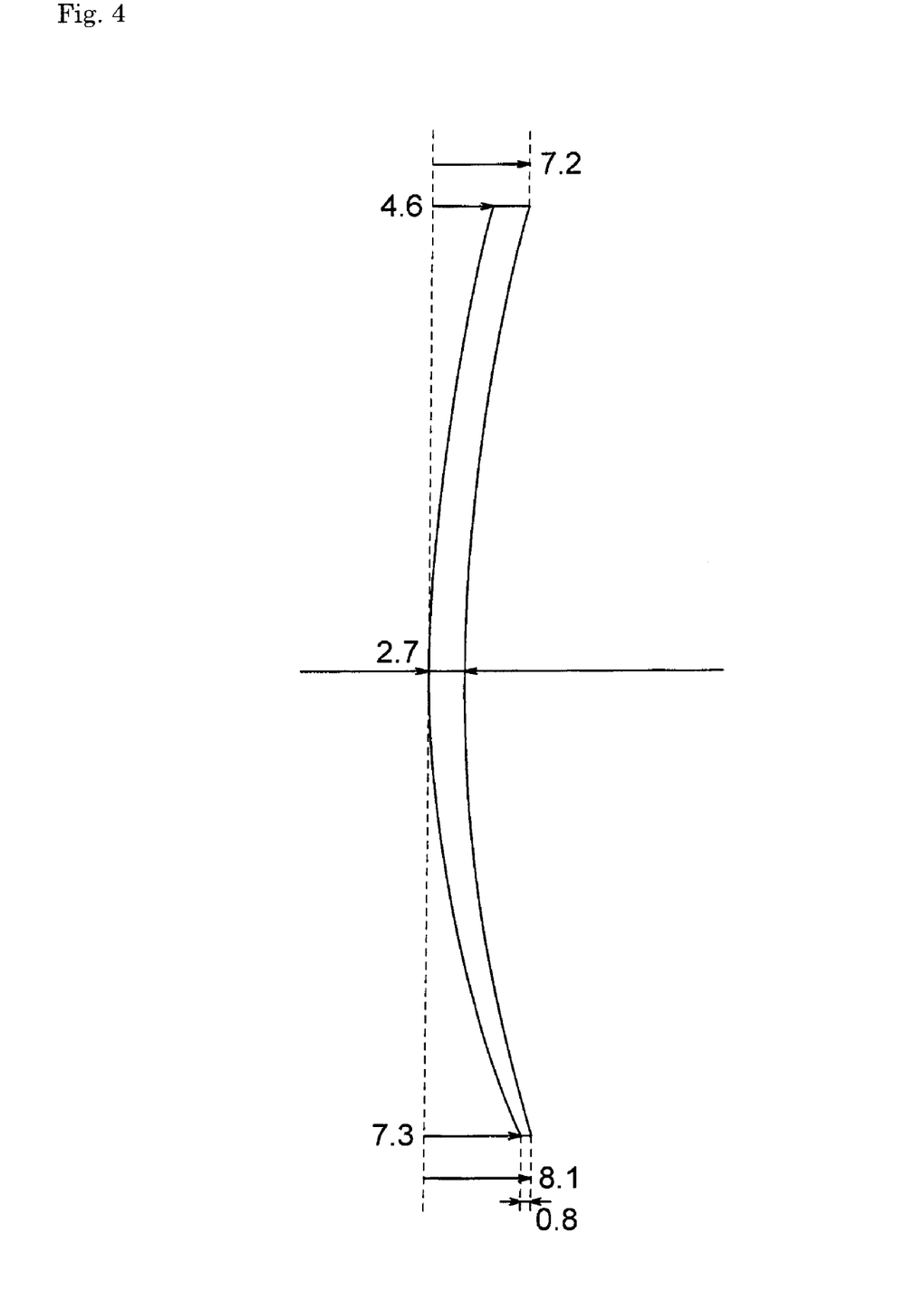
FIG. 4 is a sectional view showing a progressive addition lens in the lengthwise direction in use, the progressive addition lens being designed while optical performance is emphasized according to an embodiment of the invention.

FIG. 4 is a sectional view showing a progressive addition lens in the lengthwise direction in use, and the progressive addition lens is designed while the optical performance is emphasized rather than the appearance performance according to an embodiment of the invention. In the embodiment, the front surface has the addition power of 3.00 diopter, and the back surface has the addition power of −1.00 diopter. Accordingly, the ratio of the addition power of the front surface to the addition power of the entire lens is 1.5.

In FIG. 4, the portion for near vision (lens lower portion) has the front height of 8.1 mm, and the lens lower portion has the edge thickness of 0.8 mm.

Figure 5:
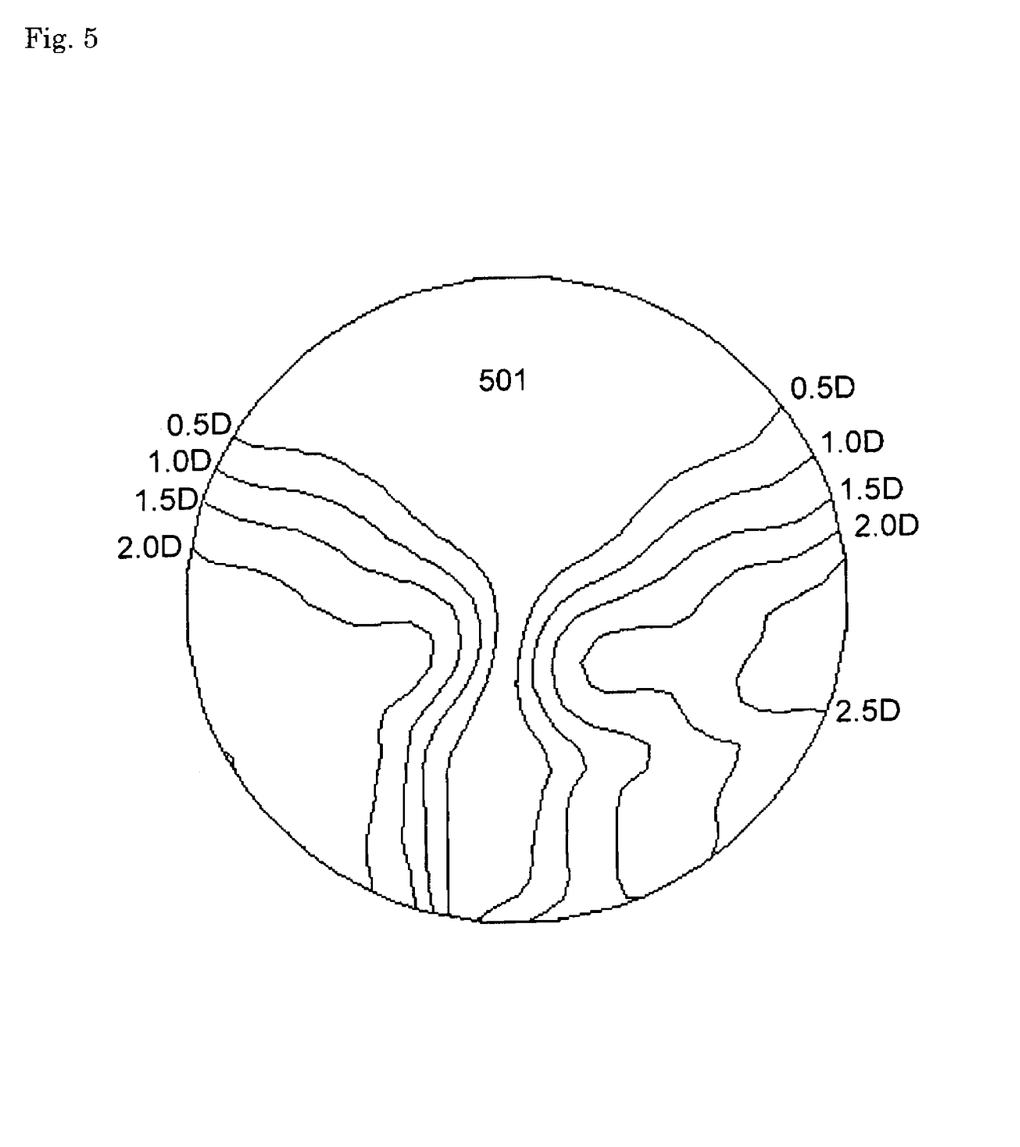
FIG. 5 shows an astigmatism distribution of the progressive addition lens of FIG. 4 with the transmitted light beam.

FIG. 5 shows an astigmatism distribution of the progressive addition lens of FIG. 4 with a transmitted light beam.

Figure 6:
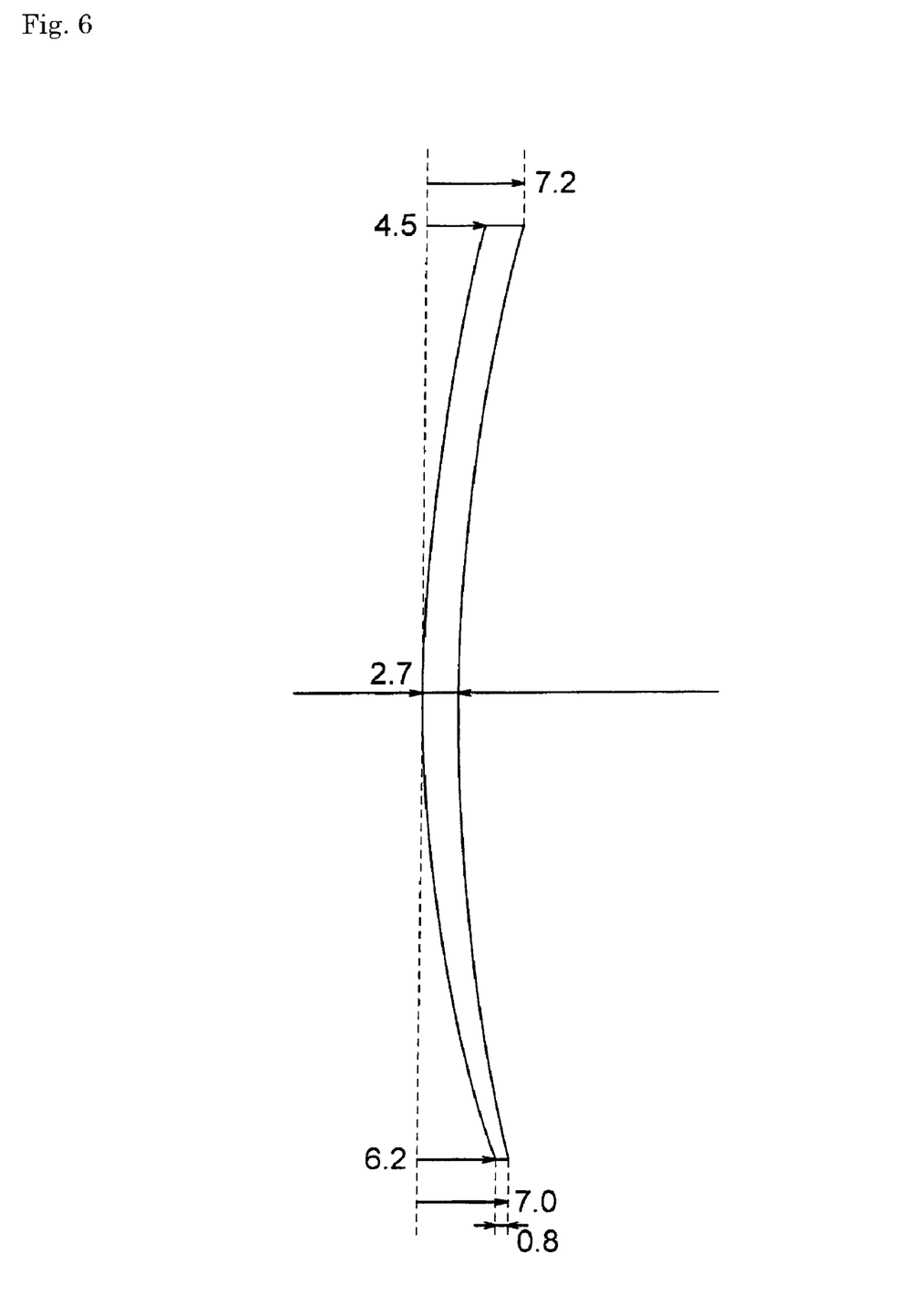
FIG. 6 is a sectional view showing a progressive addition lens in the lengthwise direction in use, the progressive addition lens being designed while the optical performance and the appearance performance are balanced according to an embodiment of the invention.

FIG. 6 is a sectional view showing a progressive addition lens in the lengthwise direction in use, and the progressive addition lens is designed while the optical performance and the appearance performance are balanced according to an embodiment of the invention. In the embodiment, the front surface has the addition power of 1.80 diopter, and the back surface has the addition power of 0.20 diopter. Accordingly, the ratio of the addition power of the front surface to the addition power of the entire lens is 0.9.

In FIG. 6, the portion for near vision (lens lower portion) has the front height of 7.0 mm, and the lens lower portion has the edge thickness of 0.8 mm.

Figure 7:
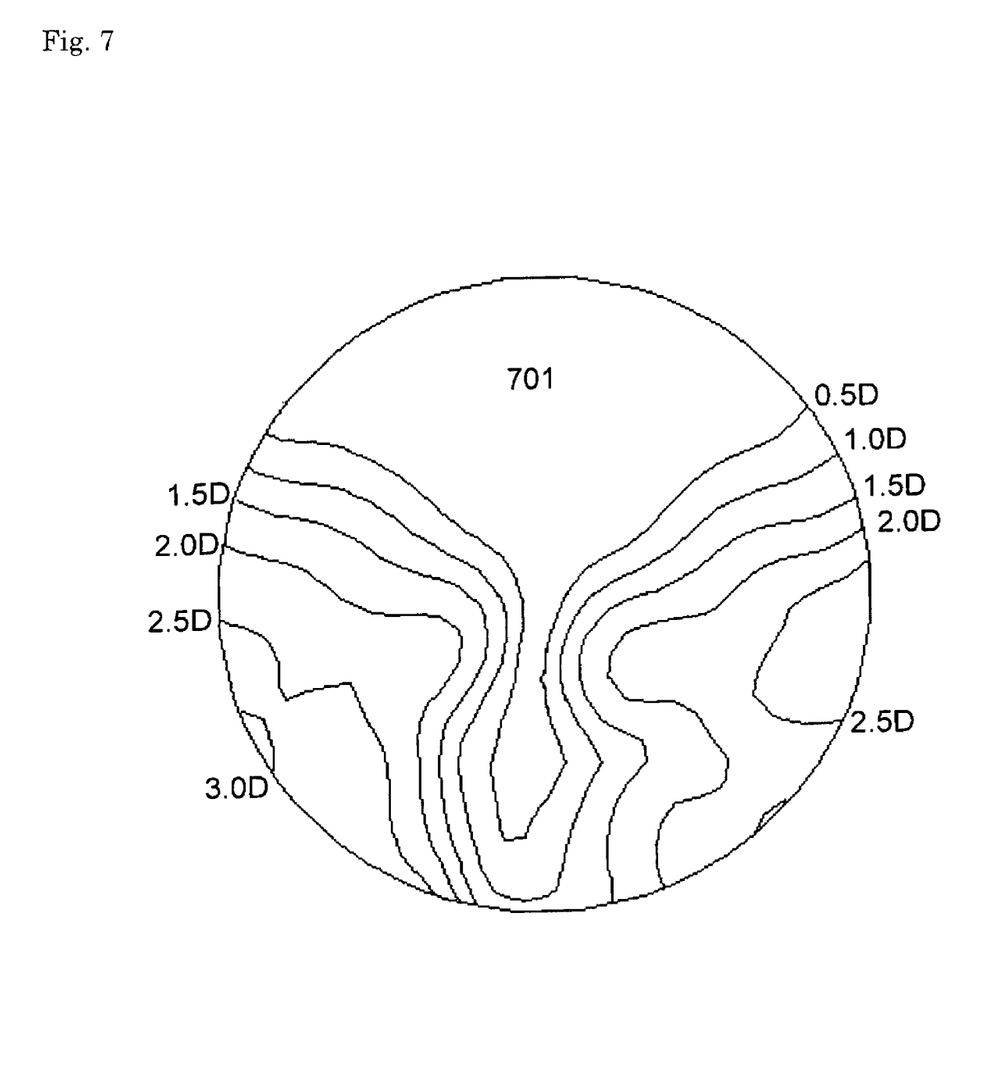
FIG. 7 shows an astigmatism distribution of the progressive addition lens of FIG. 6 with the transmitted light beam.

FIG. 7 shows an astigmatism distribution of the progressive addition lens of FIG. 6 with a transmitted light beam.

Figure 8:
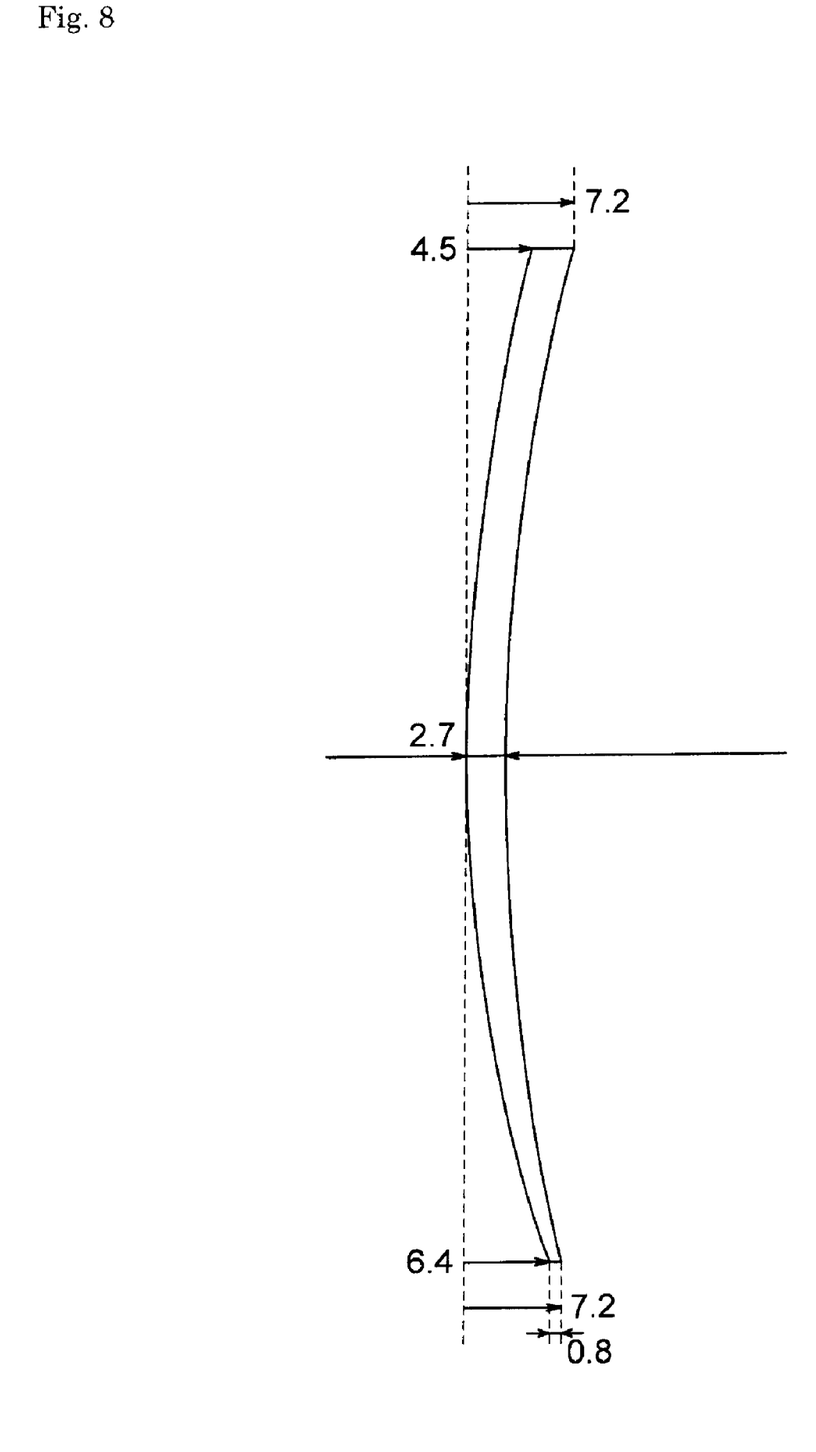
FIG. 8 is a sectional view showing another progressive addition lens in the lengthwise direction in use, the progressive addition lens being designed while the optical performance and the appearance performance are balanced according to an embodiment of the invention.

FIG. 8 is a sectional view showing another progressive addition lens in the lengthwise direction in use, and the progressive addition lens is designed while the optical performance and the appearance performance are balanced according to an embodiment of the invention. The progressive addition lens of the embodiment is equivalent to that of the conventional design method, and the progressive addition lens of the embodiment becomes a comparative reference. In the embodiment, the front surface has the addition power of 2.00 diopter, and the back surface has the addition power of 0.00 diopter. Accordingly, the ratio of the addition power of the front surface to the addition power of the entire lens is 1.0.

In FIG. 8, the portion for near vision (lens lower portion) has the front height of 7.2 mm, and the lens lower portion has the edge thickness of 0.8 mm.

Figure 9:
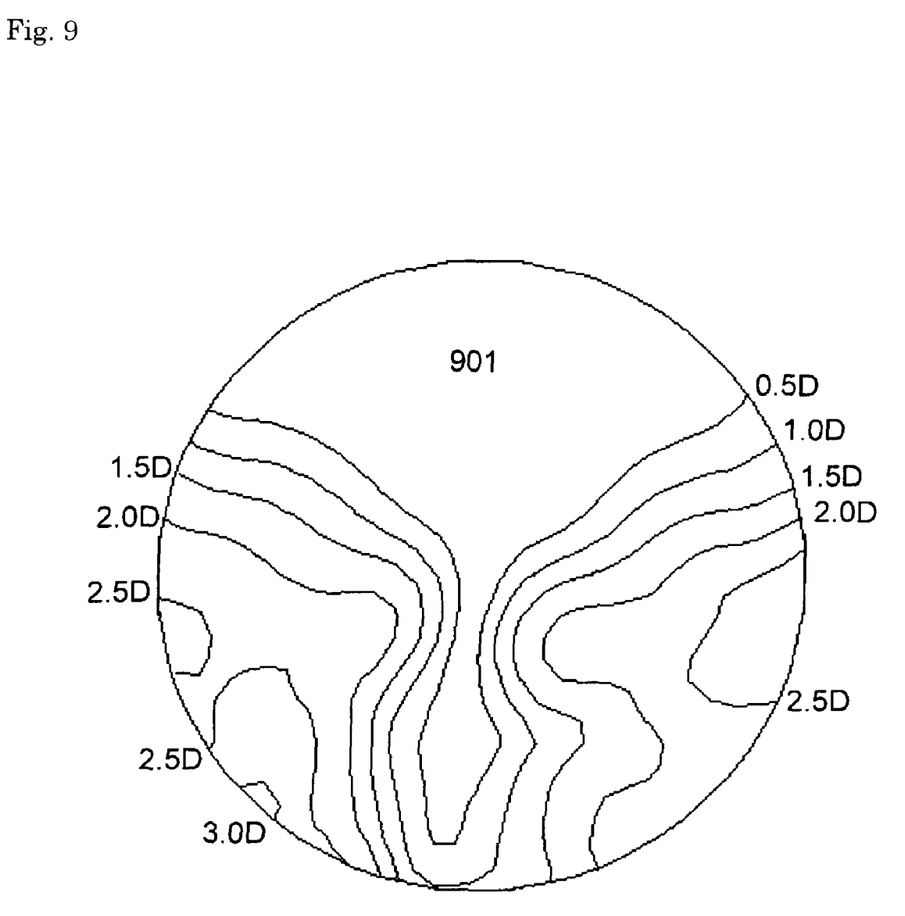
FIG. 9 shows an astigmatism distribution of the progressive addition lens of FIG. 8 with the transmitted light beam.

FIG. 9 shows an astigmatism distribution of the progressive addition lens of FIG. 8 with a transmitted light beam.

When the progressive addition lenses of FIGS. 2, 4, 6, and 8 are compared to one another, the portion for near vision (lens lower portion) has the smallest front height in the lens of FIG. 2 that is designed while the appearance performance is emphasized, and the portion for near vision (lens lower portion) has the largest front height in the lens of FIG. 4 that is designed while the optical performance is emphasized. In the lenses of FIGS. 6 and 8 in which the optical performance and the appearance performance are balanced, the portion for near vision (lens lower portion) has the front height located between the front height (lens lower portion) of the lens of FIG. 2 and the front height (lens lower portion) of the lens of FIG. 4.

When FIGS. 3, 5, 7, and 9 are compared to one another, the lens of FIG. 5, that is designed while the optical performance is emphasized, has the smallest astigmatism and the lens of FIG. 3, that is designed while the appearance performance is emphasized, has the largest astigmatism. Specifically, in regions 301, 501, 701, and 901 where the astigmatism is not more than 0.50 diopter, the region 501 of FIG. 5 becomes largest, the region 301 of FIG. 3 becomes smallest, and the region 701 of FIG. 7 and the region 901 of FIG. 9 are larger than in the region 301 of FIG. 3 and smaller than the region 501 of FIG. 5. Generally, a size of the region, where the astigmatism is not more than 0.50 diopter, is remarkably changed in the portion for near vision rather than the portion for far vision. The region 301 of FIG. 3 exists effectively although the region 301 is small in the portion for near vision.

Thus, in the invention, progressive addition lenses can efficiently be designed according to the extent to which the spectacle wearer emphasizes the appearance performance.

In the above description, the addition power of the front surface is determined after the addition power of the entire lens is determined. Obviously the back surface shape may be determined in first provided that the front surface is matched with the conditions of the invention.

A progressive addition lens producing method according to an embodiment includes progressive addition lens designing steps according to an embodiment and a step of processing the lens based on the design result.

In the embodiment, the progressive addition lens can efficiently be produced in consideration of not only the optical performance but also the appearance performance.

A progressive addition lens producing method according to another embodiment further includes a step of displaying the design result and a step of receiving the instruction whether or not the re-design is performed between the progressive addition lens designing steps and the lens processing step.

In the embodiment, the spectacle wearer, (sales clerk of) the spectacle store, concerned persons, and the like refer to the displayed design result to determine whether or not the re-design is performed, so that progressive addition lenses can be produced while better reflecting a spectacle wearer's wish and the like.

A spectacle lens supplying system according to an embodiment includes a data terminal into which the prescription data of the spectacle wearer and the extent to which the lens appearance performance is emphasized are fed; a data storage unit in which the relationship between the addition power of the entire lens and the addition power of the front surface is stored while correlated with the extent to which the lens appearance performance is emphasized; a design unit that refers to the data storage unit and determines the relationship between the addition power of the entire lens and the addition power of the front surface based on the extent to which the lens appearance performance is emphasized, the extent to which the lens appearance performance is emphasized being fed from the data terminal, the design unit producing the lens design data based on the relationship and the prescription data fed from the data terminal; and a processing machine control unit that receives the design data from the design unit and transmits the processing instruction to the processing machine based on the design data.

In the spectacle lens supplying system according to the embodiment, the design unit refers to the data storage unit, the determines the relationship between the addition power of the entire lens and the addition power of the front surface based on the extent to which the lens appearance performance is emphasized, the extent to which the lens appearance performance is emphasized being fed from the data terminal, and the design unit produces the lens design data based on the relationship and the prescription data fed from the data terminal. Accordingly, in the spectacle lens supplying system according to the embodiment, the progressive addition lens can be supplied in consideration of not only the optical performance but the appearance performance.

The invention claimed is:

1. A progressive addition lens designing method, comprising the steps of:
   determining an addition power of an entire lens which is of a sum of an addition power of a front surface and an addition power of a back surface; and
   determining the addition power of the front surface,
   wherein, in the step of determining the addition power of the front surface, the addition power of the front surface is determined so as to be not lower than zero and lower than the addition power of the entire lens when lens appearance performance is emphasized rather than lens optical performance, and
   the addition power of the front surface is determined so as to be more than the addition power of the entire lens when the lens optical performance is emphasized rather than the lens appearance performance.

2. The progressive addition lens designing method according to claim 1, wherein, in the step of determining the addition power of the front surface, a ratio of the addition power of the front surface to the addition power of the entire lens is not lower than zero and not more than 0.8 when the lens appearance performance is emphasized rather than the lens optical performance,
   the ratio of the addition power of the front surface to the addition power of the entire lens is not lower than 1.2 when the lens optical performance is emphasized rather than the lens appearance performance, and
   the ratio of the addition power of the front surface to the addition power of the entire lens is more than 0.8 and lower than 1.2 when the lens optical performance and the lens appearance performance are balanced.

3. The progressive addition lens designing method according to claim 2, wherein, in the step of determining the addition power of the front surface, the ratio of the addition power of the front surface to the addition power of the entire lens is not lower than 1.2 and not more than 3.0 when the lens optical performance is emphasized rather than the lens appearance performance.

4. The progressive addition lens designing method according to claim 3, wherein in the step of determining the addition power of the front surface, the ratio of the addition power of the front surface to the addition power of the entire lens is not lower than 1.2 and not more than 2.0 when the lens optical performance is emphasized rather than the lens appearance performance.

5. The progressive addition lens designing method according to claim 1, further comprising a step of determining a front surface shape, a back surface shape, and a lens center thickness after the step of determining the addition power of the front surface.

6. The progressive addition lens designing method according to claim 5, wherein the step of determining the back surface shape and the lens center thickness includes a step of determining the back surface shape in consideration of an user's use condition such as a distance between eyes and the lens, a gradient of a spectacle frame to which the leans is attached with respect to the eyes, and a lens shape determined from a shape of the spectacle frame to which the leans is attached.

7. A progressive addition lens producing method comprising the steps of:
   designing a progressive addition lens according to the progressive addition lens designing method as in claim 1; and
   processing the lens based on design result.

8. The progressive addition lens producing method according to claim 7, further comprising the steps of:
   displaying the design result, and
   receiving an instruction whether or not re-design is performed,
   between the step of designing the progressive addition lens and the step of processing the lens.

* * * * *